US008852456B2

(12) United States Patent
Valentin et al.

(10) Patent No.: US 8,852,456 B2
(45) Date of Patent: Oct. 7, 2014

(54) METHOD FOR THE PRODUCTION OF HYDROGEN COMBINED WITH CARBON DIOXIDE CAPTURE

(75) Inventors: Solene Valentin, Meudon (FR); Paul Terrien, Baltimore, MD (US); Pascal Tromeur, Rillieux-la-Pape (FR)

(73) Assignee: L'air Liquide, Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 166 days.

(21) Appl. No.: 13/512,631

(22) PCT Filed: Dec. 2, 2010

(86) PCT No.: PCT/EP2010/068719
§ 371 (c)(1),
(2), (4) Date: May 30, 2012

(87) PCT Pub. No.: WO2011/067326
PCT Pub. Date: Jun. 9, 2011

(65) Prior Publication Data
US 2012/0241678 A1    Sep. 27, 2012

(30) Foreign Application Priority Data

Dec. 3, 2009   (FR) ...................................... 09 58608

(51) Int. Cl.
*C01B 3/30*        (2006.01)
*C01B 3/56*        (2006.01)
(Continued)

(52) U.S. Cl.
CPC ....... *C01B 3/384* (2013.01); *B01D 2259/40039* (2013.01); *C01B 3/56* (2013.01); *C01B 2203/147* (2013.01); *C01B 2203/0283* (2013.01); *B01D 2257/504* (2013.01); *B01D 2259/40069* (2013.01); *C01B 3/48* (2013.01); *C01B 2203/148* (2013.01); *C01B 3/501*
(Continued)

(58) Field of Classification Search
USPC ............. 62/607; 518/700; 422/234; 252/373; 48/197 R
See application file for complete search history.

(56) References Cited

U.S. PATENT DOCUMENTS 7,306,651 B2   12/2007   Cieutat et al.
7,381,242 B2   6/2008   De Souza
(Continued)

FOREIGN PATENT DOCUMENTS

| WO | WO2006054008 | 5/2006 |
| WO | WO 2006054008 A1 * | 5/2006 |
| WO | WO2006097703 | 9/2006 |

OTHER PUBLICATIONS

PCT/EP2010/068719, International Search Report, May 11, 2011.

*Primary Examiner* — Stanley Silverman
*Assistant Examiner* — Syed Iqbal
(74) *Attorney, Agent, or Firm* — Justin K. Murray

(57) ABSTRACT

The present invention relates to a method for the combined production of hydrogen and carbon dioxide from a hydrocarbon mixture, in which the hydrocarbon mixture is reformed to produce a syngas which is cooled, then enriched with H2 and CO2, optionally dried, and treated in a PSA hydrogen purification unit to produce hydrogen, the PSA offgas being treated to capture the CO2 and to supply an offgas. This offgas is again treated to supply a stream enriched with H2 and CO2 which is returned to the PSA, where it constitutes a second feed distinct from the main feed.

7 Claims, 2 Drawing Sheets

(51) Int. Cl.
   *C01B 3/48* (2006.01)
   *C01B 3/50* (2006.01)
   *C01B 3/38* (2006.01)
   *B01D 53/047* (2006.01)

(52) U.S. Cl.
   CPC ......... (2013.01); *C01B 3/506* (2013.01); *C01B 2203/0405* (2013.01); *B01D 2259/4003* (2013.01); *C01B 2203/043* (2013.01); *C01B 2203/1241* (2013.01); *C01B 2203/0475* (2013.01); *C01B 2203/0233* (2013.01); *B01D 2259/40001* (2013.01); *B01D 53/047* (2013.01); *C01B 2203/046* (2013.01); *Y02C 10/08* (2013.01); *B01D 2256/16* (2013.01); *B01D 2259/40045* (2013.01)
   USPC ........................................ 252/373; 48/197 R

(56) References Cited

U.S. PATENT DOCUMENTS

2005/0257566 A1* 11/2005 De Sousa .................. 62/607
2009/0298957 A1* 12/2009 Gauthier et al. ............ 518/700

* cited by examiner

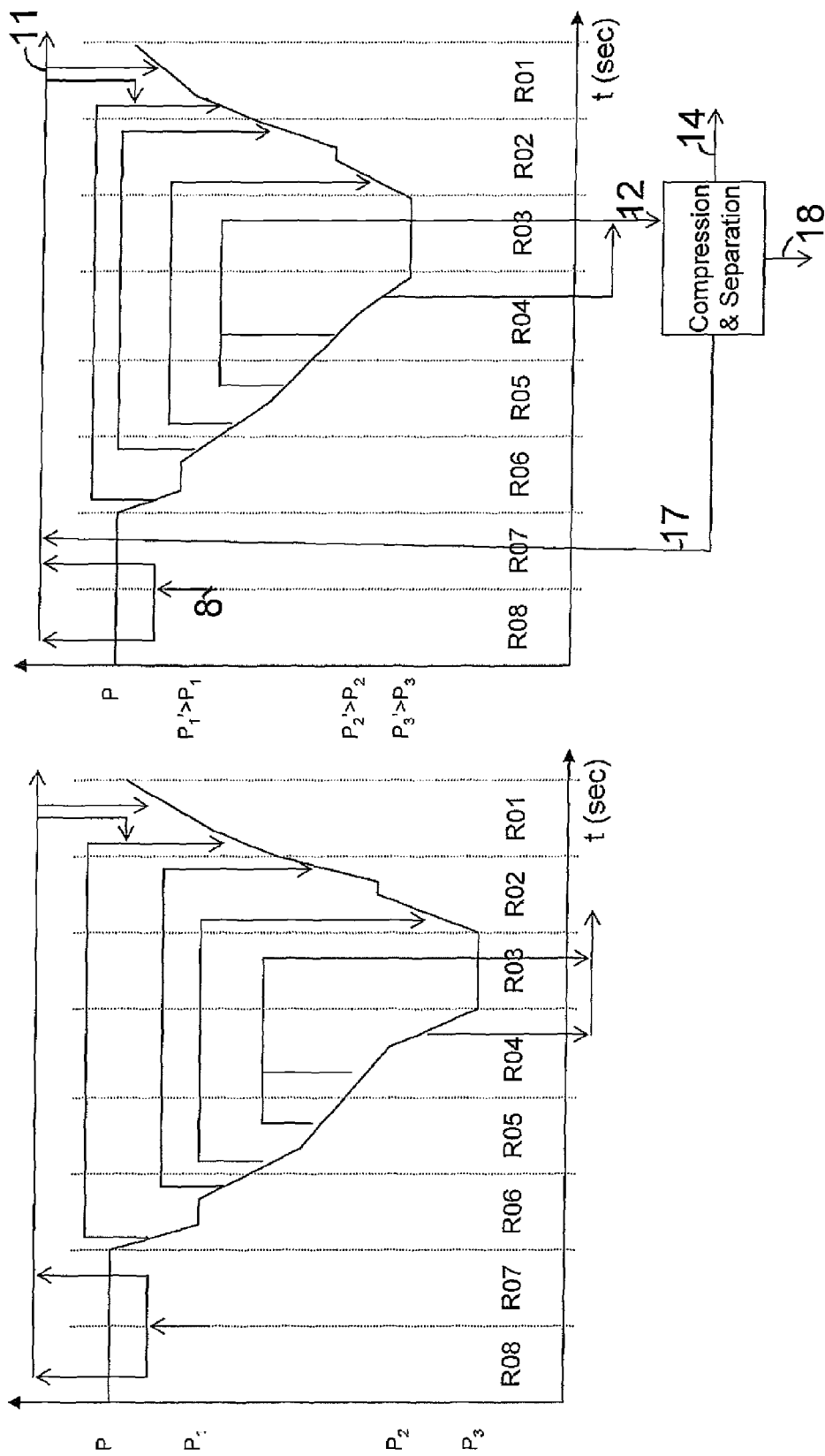

METHOD FOR THE PRODUCTION OF HYDROGEN COMBINED WITH CARBON DIOXIDE CAPTURE

CROSS-REFERENCE TO RELATED APPLICATIONS

This application is a §371 of International PCT Application PCT/EP2010/068719, filed Dec. 28, 2010, which claims §119(a) foreign priority to French patent application 0958608, filed Dec. 3, 2009.

BACKGROUND

The present invention relates to a method for the combined production of hydrogen and carbon dioxide from a hydrocarbon mixture, in which the hydrocarbon mixture is reformed to produce a syngas which is cooled, then enriched with $H_2$ and $CO_2$, optionally dried, and treated in a PSA hydrogen purification unit to produce hydrogen, the offgas being treated to capture the $CO_2$.

Climate change is one of today's major environmental problems. The increase in the concentration of greenhouse gases in the atmosphere, particularly carbon dioxide, is one of its essential causes. One of the major challenges facing mankind today is to decrease greenhouse gas emissions, and in particular to decrease $CO_2$ emissions.

$CO_2$ produced by man originates from many sources, and each type of emission must be decreased. However, one of the essential emissions is that generated by the combustion of fuels, especially fossil fuels.

The European Community is committed to achieving an 8% reduction of its greenhouse gas emissions between 2008 and 2012, compared to the 1990 level. To help obtain this result, directive 2003/87/EC establishes an emission trading system (ETS) for greenhouse gas emissions. Thus industrial facilities must buy quotas corresponding to their greenhouse gas emissions, and particularly carbon dioxide.

Plants producing hydrogen and carbon monoxide emit carbon dioxide by burning fuel. The $CO_2$ contained in the flue gases originates from the combustion of valueless gases generated in the process and recycled in the form of fuel, and from additional fuels such as naphtha and natural gas.

While plants producing $H_2$/CO are not yet concerned, they will be included in the ETS from 2013 onwards.

Moreover, alongside directive 2003/87/EC—which is only concerned with European Union countries (where the ETS will be applied)—another requirement has recently emerged, concerning all countries: applications for permits to operate industrial facilities may be dependent on the capacity of the facility to capture the $CO_2$ emissions.

Thus, since they will shortly be subject to both these requirements, such facilities, and hydrogen plants in particular, must forthwith develop high yield $CO_2$ capture solutions.

$CO_2$ capture operations capture the $CO_2$ present in the combustion flue gases, and also the $CO_2$ present in the process gas.

It is the object of the invention to improve this second type of $CO_2$ capture operation.

$CO_2$ capture solutions on process gas that are currently feasible—technically and/or financially—only succeed in capturing up to 60% of the $CO_2$ present. A characteristic example is the amine (MDEA) scrubbing technology on high-pressure syngas.

Let is now consider the particular case of hydrogen production.

In order to produce hydrogen from a hydrogen-rich gas, typically a syngas, the process used to separate and purify the hydrogen is the pressure swing adsorption (PSA) process. This process generates a stream of pure hydrogen, generally having a purity above 99% by volume, and a hydrogen-lean offgas containing the other species present in the initial mixture to be purified, including the $CO_2$.

One solution currently used to capture the $CO_2$ consists in recovering it from the offgas from the hydrogen purification unit, via a compression and purification unit (CPU).

At present, optimizing the operation of a hydrogen purification unit by pressure swing adsorption—also called $H_2$ PSA—means seeking to achieve two objectives:
- to obtain a given hydrogen purity (for example containing a maximum of a few ppm of $CO_2$), and
- to obtain a high total yield of hydrogen product by the unit.

However, since an improved $CO_2$ capture solution needs to be adopted in order to take account of this new requirement on limiting $CO_2$ emissions, a hydrogen production process will therefore also have to integrate a $CO_2$ capture process, having a high $CO_2$ capture yield.

Therefore, the problem facing a person skilled in the art is to reconcile a high hydrogen yield with an equally high $CO_2$ capture yield.

SUMMARY

It is therefore the object of the present invention to solve the dual problem of producing high-purity hydrogen—the primary function of the installation to which the invention applies—and improving capture of the carbon dioxide contained in the process gas, that is to say increasing the $CO_2$ capture yield and increasing the energy efficiency of the $CO_2$ capture process, while maintaining a high total $H_2$ production yield by the unit.

The inventive solution enables this result to be achieved by optimizing the operation of the PSA hydrogen purification unit to meet the new requirements imposed by the capture of $CO_2$ from the offgas.

Document WO 2006/054008 describes a method for the combined production of hydrogen and carbon dioxide from a syngas obtained by reforming natural gas, in which a carbon dioxide-enriched fluid is recovered by treating the offgas from the $H_2$ PSA unit, this treatment serving to obtain at least one liquid or supercritical carbon dioxide-rich stream and a hydrogen-rich gas stream containing most of the remaining $CO_2$. This document also discloses treating this second stream in a permeation unit in order to produce two streams, one of which is sent to reforming, while the other, enriched with $H_2$ and $CO_2$, is recycled into the feed to the PSA unit.

It is also known how to modify the operation of a $H_2$ PSA by recycling a fraction of the PSA offgas to the PSA itself in the form of a secondary feed, the two streams entering the PSA unit separately and sequentially in the pressure swing cycle. This introduction of two streams having different purities in two successive steps serves to prolong the production phase over one cycle. Moreover, since the stream that is richer in impurities is introduced second, its separate use serves to significantly lower the hydrogen partial pressure in the adsorber and to maximize the saturation of the adsorbent beds with impurities. If the other parameters of the PSA are unchanged, this lower hydrogen partial pressure at the end of the production step is reflected, in the subsequent regeneration steps, by a lower loss of hydrogen in the offgas and, in consequence, a substantial improvement in the hydrogen yield of the PSA.

Various exemplary uses of the dissociation of the feeds are described in the above documents.

Document U.S. Pat. No. 7,381,242 describes a PSA process for producing hydrogen in which the adsorbent regeneration pressure is particularly high (above 2 bar abs), allowing the use of the PSA offgas in a fuel network of the petrochemical plant in which the PSA is installed. This is made feasible by the use of a succession of carefully selected adsorbents and the use of a purge gas that lowers the partial pressure of the elements to be desorbed.

Document U.S. Pat. No. 7,306,651 describes a PSA process for producing hydrogen in which the high-pressure hydrogen production phase is followed by the following main phases:
 a decompression phase in which a gas recycled after compression is introduced at a lower pressure than the initial pressure and in which the offgas is produced at this intermediate pressure,
 a purge phase in which a purge gas is produced and is then compressed and recycled to the process.

Document US 2005/257566 A1 describes a PSA process for producing hydrogen in which the regeneration phase is characterized by:
 all of the streams coming from the cocurrent depressurization adsorbers are sent to adsorbers undergoing the elution step; and
 at least some of the streams from the adsorbers undergoing the regeneration phase are recycled as feed for the adsorbers undergoing the adsorption phase after compression to the adsorption pressure.

However, while interest has hitherto been focused on improving PSA performance for the production of hydrogen, and on improving $CO_2$ capture performance, this leaves unsolved the question of improving both hydrogen production and $CO_2$ capture together.

The problem that the invention attempts to solve is therefore to find a method for producing hydrogen combined with $CO_2$ capture, each of these processes providing an optimized total yield, and the invention is accordingly aimed in particular to optimize the combination of hydrogen purification/separation by pressure swing adsorption and the recovery of $CO_2$, within the hydrogen production installation.

It is therefore concerned with a method combining hydrogen production and carbon dioxide capture from a syngas obtained by reforming hydrocarbons and in particular natural gas, in which the hydrogen is produced by separation in the hydrogen purification unit ($H_2$ PSA) and in which all or part of the carbon dioxide contained in the syngas is captured by treating the offgas from the hydrogen purification ($H_2$ PSA) unit, thereby obtaining at least one liquid or supercritical carbon dioxide-rich stream and one $H_2$-rich gas stream containing most of the $CO_2$, and in which, in order to achieve this goal, the operation of the hydrogen separation step by adsorption is reviewed with a dual objective:
 to produce a PSA offgas at a higher pressure than the pressure normally employed, so as to limit the need for subsequent compression of the said offgas, and hence the attendant costs,
 and also to increase the total $CO_2$ capture and hydrogen production yields of the installation.

In the context of the present invention, total hydrogen yield means the ratio of the molar flow rate of hydrogen product to the molar flow rate of natural gas used as the primary feed to the SMR unit which must not be likened to the hydrogen yield of the PSA unit, which is the ratio of the molar flow rate of pure hydrogen produced by the PSA unit to the molar flow rate of hydrogen in the feed to the PSA unit. Total $CO_2$ capture yield means the ratio of the molar flow rate of $CO_2$ captured to the sum of the molar flow rates of emitted and captured $CO_2$, which is different from the $CO_2$ capture yield of the CPU, which is the ratio of the flow rate of pure $CO_2$ produced to the molar flow rate of $CO_2$ in the feed to the CPU.

In a standard method for producing hydrogen, the total hydrogen product yield depends on the following parameters:
 conversion rate of natural gas to hydrogen during the pre-reforming, reforming and shift reactions,
 yield of the PSA unit.

In the production method according the invention, which includes the capture of the $CO_2$ contained in the syngas upstream of the PSA, which is then found in the PSA offgas, the total hydrogen yield of the installation also takes account of the recycle rate to the PSA of a hydrogen-enriched stream issuing from the offgas.

Thus, a decrease in the hydrogen yield of the PSA unit no longer necessarily means a loss of total $H_2$ yield of the installation, but may mean that a larger quantity of hydrogen is recycled. A lower yield in the PSA is therefore no longer necessarily detrimental, and may even be desirable, particularly when accompanied by an increase in the outlet pressure of the PSA offgas. The increase in hydrogen recycle is also accompanied by an increase in carbon dioxide recycle and thereby serves to increase the total $CO_2$ yield.

The operation of PSA (and VPSA) units has already been extensively investigated for various types of separation. The PSA process is based on the principle that adsorbents are capable of adsorbing more impurities at a higher gas phase partial pressure than at a lower partial pressure; thus, the impurities are adsorbed on the adsorbent at high pressure, and are desorbed when the pressure of the system decreases.

Although in its principle the PSA process is a batch process in which high purity hydrogen is produced by the system at a pressure close to the feed pressure while the offgas containing impurities and "lost" hydrogen is available at a low pressure called offgas pressure, in practice the process uses many adsorbers whose operations are staggered, so that the process appears to be continuous when battery limits are considered.

A PSA cycle contains the following five basic steps, which are applied in all PSA units, regardless of the number of adsorption modules:
 adsorption,
 cocurrent depressurisation,
 countercurrent depressurisation,
 low-pressure purge,
 repressurisation.

Among the parameters influencing the $H_2$ PSA process, the following are essential:
 feed and purge pressures (offgas pressure),
 feed gas composition (PSA feed gas),
 product purity required.

The feed pressure is commonly between 10 and 40 bar—a high feed pressure is preferred, allowing a better hydrogen yield ($H_2$ yield), at low investment cost, and the hydrogen product is available at a pressure similar to the feed pressure minus 0.5 bar.

The offgas pressure may vary between atmospheric pressure and about ten bar. This parameter has a considerable effect on the $H_2$ yield. When all the other parameters are fixed, the lower the offgas pressure, the better the yield of the cycle and consequently the higher the offgas pressure, the more degraded the yield of the cycle.

As already mentioned above, the invention relates to the combined production of hydrogen with carbon dioxide capture, each of these production/capture processes having an optimized total yield.

For this purpose, the invention proposes a method for the combined production of hydrogen and carbon dioxide from a hydrocarbon mixture, comprising at least the following steps:

- a step (a) of reforming the hydrocarbon mixture to obtain a syngas containing at least hydrogen, carbon monoxide, carbon dioxide, methane, water vapour and impurities,
- a step (b) of cooling the syngas with recovery of the available heat,
- a step (c) of a shift reaction of all or part of the cooled syngas to oxidise most of the carbon monoxide to carbon dioxide with the corresponding production of hydrogen,
- a step (d) of cooling the syngas enriched with $H_2$ and $CO_2$ issuing from step (c) with removal of the condensed water,
- an optional step (e) of additional drying of the cooled syngas to remove the water molecules and to obtain a dry syngas (for example by using a TSA adsorption process),
- a step (f) of separating the dry syngas in a pressure swing adsorption ($H_2$ PSA) unit having N adsorbers for obtaining a hydrogen-enriched high-pressure stream and a PSA offgas stream Rpsa containing at least carbon dioxide, hydrogen and impurities,
- a step (g) of treating the Rpsa stream to obtain a liquid or supercritical $CO_2$ stream and a hydrogen-enriched capture offgas Rc, characterised in that the Rc offgas is further subjected to at least the following treatment steps:

- a step (h) of producing at least two gas streams I and II in which the stream I contains a proportion of hydrogen at least equal to that of the Rc offgas, and the stream II contains a proportion of carbon dioxide at least equal to that of the Rc offgas,
- a step (i) of recycling all or part of the stream II to the reforming step, and
- a step (j) of recycling all or part of the gas stream I to the pressure swing adsorption separation step (f), and in which the gas stream I is recycled so that the Rpsa offgas is produced at an average regeneration pressure $P_{Rpsa}$ of greater than 1.5 bar abs., preferably between 1.5 bar and 5 bar, and the syngas stream fed to the separation step (f) and the stream I recycled to the step (j) are introduced separately and sequentially into the PSA separation step.

The process of the invention is distinguished by an offgas pressure (above 1.5 bar abs) higher than in a conventional PSA scheme (1.3 bar abs). This higher pressure is advantageous in this particular context as it makes it possible to increase the energy efficiency (lower offgas compression) of the capture process without degrading the total hydrogen yield (the lost hydrogen is recycled into the PSA unit).

In fact, as we recalled above, a PSA unit is a system having multiple adsorption modules, with N modules (or adsorbers) constituting the PSA unit. Each adsorber of the unit applies the same adsorption cycle comprising at least the well-known elementary phases described above, these phases being staggered from one adsorber to the other by one $N^{th}$ of the cycle time (in the case of a large number of adsorbers, they can operate in pairs, or more).

The process gas—i.e. the syngas stream issuing from the reforming process—constitutes the main feed to the PSA unit which is called the "rich feed", is richer in hydrogen than the recycle stream, and contains between 60 and 85 mol % of $H_2$, preferably between 70 and 80%.

The stream I, recycled from the offgas treatment unit to separate the $CO_2$—constitutes the secondary feed. This stream is called the "lean feed", and contains between 40 and 80 mol % of $H_2$, preferably between 50 and 70%.

The inventive method also advantageously has all or some of the following features.

Advantageously, for any adsorber of the PSA unit, the syngas stream fed to the separation step (f) constitutes the main feed called rich feed which is introduced first into the said adsorber to produce the high-pressure product $H_2$, and the recycled stream I constitutes the secondary feed, called lean feed, which is introduced later into the adsorber so as to achieve a better $CO_2$ saturation of the adsorbent bed.

The operation—for a given adsorber—is as follows: the rich feed is introduced first, and is purified to produce high-pressure hydrogen. The lean feed is introduced second and serves to obtain a better saturation of the adsorbent bed(s) with impurities, and in particular with $CO_2$. These sequenced introductions, coupled with the adoption of an appropriate cycle, result in a high impurity concentration in the offgas, which consequently leads to an offgas obtained at higher pressure.

Another aspect of the sequenced introduction of the primary feed and the secondary feed is an increase in the hydrogen yield of the PSA unit. This advantage partially offsets the negative impact, on the yield, of the increase in the offgas pressure as mentioned above.

Advantageously, the step (g) is a compression and purification step by partial condensation and/or distillation for obtaining the $CO_2$-rich liquid or supercritical stream.

Advantageously, the step (h) of treating the Rc offgas is a membrane separation step producing at least the two streams I and II, the stream I being at the pressure of the PSA (typically 20 to 30 bar abs) and enriched at least with $H_2$ and preferably with $CO_2$, while the stream II is at very high pressure (typically at least 40 bar abs) and is depleted of hydrogen and preferably of $CO_2$.

The hydrogen-rich stream I containing most of the remaining carbon dioxide is recycled to the $H_2$ PSA. All the secondary components (nitrogen, methane, carbon monoxide in particular) permeate less than the $CO_2$ and hydrogen, thus permeating sufficiently little to avoid accumulating in the system.

Advantageously, the two streams fed to the step (f), that is the syngas stream and the recycled stream I, are introduced via separate feed lines equipped with separate valve lines so that the step (f) can be carried out in two distinct modes, either without $CO_2$ capture, or with $CO_2$ capture.

The transition from one mode to the other is obtained by programming two distinct cycles and a passage from one cycle to the other according to the operating mode.

One advantage of this particular configuration is that the PSA can be operated with or without the impure feed (two different valve lines are designated and used), thereby serving to distinguish between 2 operating modes:

1. PSA without $CO_2$ capture.
2. PSA with $CO_2$ capture (combined with an additional separation unit).

The transition from one mode to the other is obtained simply by programming two distinct cycles and passing from one cycle to the other when the capture unit is put into operation.

The remaining gas stream—syngas highly depleted of hydrogen and carbon dioxide—is recycled to the process, at least part of it as fuel in the reforming furnace.

When it operates according to the inventive method, the pressure swing adsorption unit (or $H_2$ PSA) serves to obtain a high-pressure hydrogen-enriched stream having a purity of at least 98%, and it operates with a yield of between 70 and 95%, preferably lower than 85%. The offgas containing carbon dioxide can then be recovered at medium pressure (i.e. at a pressure higher than 1.5 bar abs, preferably at a pressure higher than 2 bar abs).

BRIEF DESCRIPTION OF THE DRAWINGS

Other features and advantages of the present invention will appear from a reading of the description below of an exemplary and non-limiting embodiment, with reference to the appended figures in which:

FIGS. 2a and 2b show the variation in the pressure of a PSA adsorber, part of a hydrogen purification unit with eight adsorbers, over a complete cycle according to two operating modes:

FIG. 2a is a schematic view showing the operation of a PSA adsorber, part of a hydrogen purification unit with eight adsorbers, in an operating mode according to the prior art;

FIG. 2b is a schematic view showing the operation of a PSA adsorber, part of a hydrogen purification unit with eight adsorbers, in an operating mode according to the invention.

DETAILED DESCRIPTION OF THE INVENTION

Figure 1:
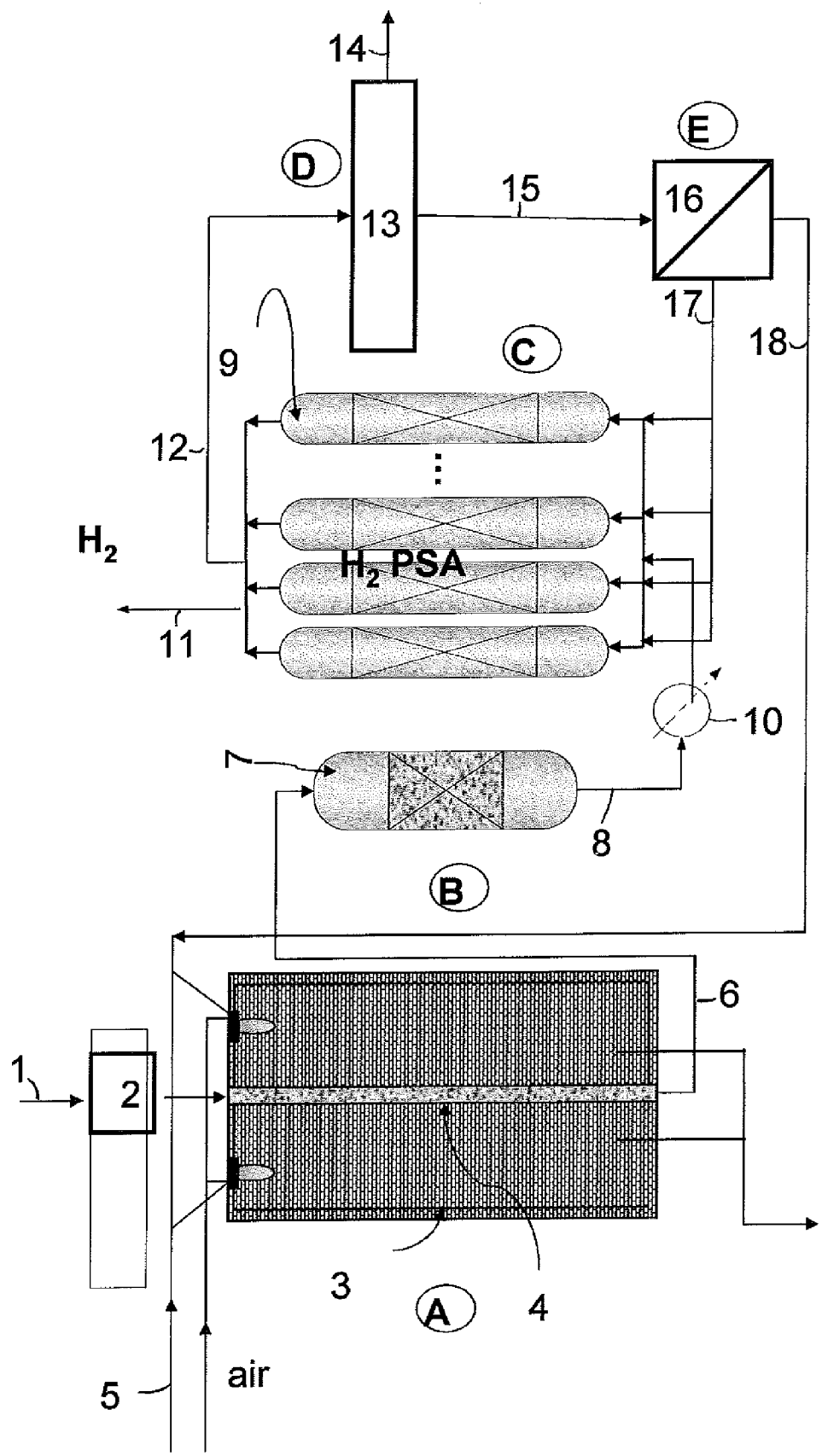
FIG. 1 is a schematic view of a hydrogen production process combined with carbon dioxide capture according to the invention.

FIG. 1 describes a method for producing hydrogen and carbon dioxide according to the invention. Step A serves to generate a syngas containing at least methane, hydrogen, carbon monoxide and carbon dioxide, from a mixture of hydrocarbons and water vapour. During this step A, the hydrocarbon/water vapour mixture 1, previously pretreated in 2 to protect the reforming catalyst from poisoning, is introduced into a steam-reforming furnace 3 containing tubes 4 filled with catalysts, the heat required for reforming being supplied by the combustion in air of fuels 5. After cooling the syngas 6, step B serves to improve the hydrogen production by treating the said syngas 6 by the water gas reaction (shift reaction) in a reactor 7 called Shift reactor. The gas 8 leaving the shift is treated in a step C. The step C is a step of hydrogen purification by pressure swing adsorption, carried out in a PSA unit 9, and may be preceded by a drying 10. The step C produces a stream of hydrogen gas 11 and a PSA offgas 12. The stream 12 is then treated in $CO_2$ capture step D. For this $CO_2$ capture, a solution 13 implemented at high pressure is generally preferred. This capture step produces a stream 14 of pure $CO_2$ and a stream 15, which is then treated in a step E, carried out in 16, which serves to preferably separate the hydrogen and the carbon dioxide from the other components. The stream 17 enriched with hydrogen and carbon dioxide is recycled to each cylinder of the hydrogen purification unit when the cylinder approaches the saturation of the bed. This stream 17 therefore serves to complete the saturation of the bed with impurities and serves to increase the pressure of the offgas of the PSA unit. The hydrogen yield per cylinder is increased relative to an addition of the stream enriched with hydrogen and with carbon dioxide into the feed for the PSA unit. The stream 18 containing the rest of the components of stream 15 is sent to step A as supplementary fuel.

According to the selected example in FIGS. 2a and 2b, the cycle operates on eight cylinders (adsorbers).

For a cylinder, the prior art cycle presented (FIG. 2a) consists mainly of the following steps:

a production phase (R08 and R07) at the adsorption pressure P from feed gas, a first balancing phase (R06) at the balancing pressure $P_1$, a second balancing phase followed by a third balancing phase (R06 and R05), a phase (R05 and R04) of production of the elution gas up to the intermediate pressure $P_2$, a depressurisation phase (R04) to the regeneration pressure $P_3$, an elution phase (R03) at the regeneration pressure $P_3$, three phases (R02 and R01) of repressurisation by balancing, a final repressurisation phase (R01) with the feed gas.

The cycle described by an adsorber in the context of the present invention consists of the following steps:

a production phase (R08 and R07) at the adsorption pressure P from feed gas 8 (rich feed), a production phase (R07) at the adsorption pressure P from recycled gas 17 (lean feed), a first balancing phase (R06) at the balancing pressure $P_1'$ with $P'1>P1$, a second balancing phase followed by a third balancing phase (R06 and R05), a phase (R05 and R04) of production of elution gas to the intermediate pressure $P_2'$ with $P'2>P2$, a depressurisation phase (R04) to the regeneration pressure $P_3'$, an elution phase (R03) at the regeneration pressure $P_3'$ with $P'3>P3$, three phases (R02 and R01) of repressurisation by balancing, a final repressurisation phase (R01) with the feed gas.

Among the features and advantages of the invention, it should therefore be mentioned in particular that:

the PSA purification unit employed according to the invention is distinguished in particular in that the various balancing pressures, the intermediate pressure and the regeneration pressure, are higher than in the prior art ($P_i'>P_i$). This increase in pressure is made possible by the use of the recycle gas which saturates the adsorbent beds with impurities more substantially, preserving a production phase of the same duration;

it should be noted that the yield of the PSA adapted to the optimization of the $CO_2$ and hydrogen coproduction flowchart is therefore low in comparison with the conventional methods for producing hydrogen (typically 88% yield);

the inventive method is thus simultaneously a method of deballasting the gas to be treated of $CO_2$. The recycle to reforming thereby serves to utilise the pressure restored in the methane and CO reforming gases and the pressure restored in the hydrogen, allowing its re-introduction into the PSA unit.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A method for the combined production of hydrogen and carbon dioxide from a hydrocarbon mixture, comprising:

(a) reforming the hydrocarbon mixture to obtain a syngas containing at least hydrogen, carbon monoxide, carbon dioxide, methane, water vapor and impurities, (b) cooling the syngas with recovery of available heat, (c) oxidizing most of the carbon monoxide to carbon dioxide with the corresponding production of hydrogen, in a shift reaction of all or part of the cooled syngas,
(d) cooling the syngas enriched with H2 and CO2 issuing from step (c) with removal of the condensed water,
(e) removing the water molecules and obtaining a dry syngas, by additional drying,
(f) separating the dry syngas in a pressure swing adsorption (H2 PSA) unit having N adsorbers for obtaining a hydrogen-enriched high-pressure stream and a PSA offgas stream Rpsa containing at least carbon dioxide, hydrogen and impurities,
(g) treating the Rpsa stream to obtain a liquid or supercritical CO2 stream and a hydrogen-enriched capture offgas Rc, wherein the Rc offgas is further subjected to at least the following treatment steps:
(h) producing at least two gas streams I and II in which the stream I contains a proportion of hydrogen at least equal to that of the Rc offgas, and the stream II contains a proportion of carbon dioxide at least equal to that of the Rc offgas,
(i) recycling all or part of the stream II to the reforming step, and
(j) recycling all or part of the gas stream I to the pressure swing adsorption separation step (f),
and in which the gas stream I is recycled so that the Rpsa offgas is produced at an average regeneration pressure PRpsa of greater than 1.5 bar,
and the syngas stream fed to the separation step (f) and the gas stream I recycled to the step (j) are introduced separately and sequentially into the PSA separation step.

2. The method of claim 1, in which for any adsorber of the PSA unit, the syngas stream fed to the separation step (f) constitutes the main feed called rich feed which is introduced first into the said adsorber to produce the high-pressure product H2, and the recycled stream I constitutes the secondary feed, called lean feed, which is introduced later into the adsorber so as to achieve a better CO2 saturation of the adsorbent bed.

3. The method of claim 1 in which step (g) is a compression and purification (CPU) step for obtaining the CO2-rich liquid or supercritical stream.

4. The method of claim 1 in which step (h) of treating the Rc offgas is a membrane separation step producing at least the two streams I and II, the stream I being at the pressure of the PSA and enriched at least with H2 and with CO2, while the stream II is at very high pressure and is depleted of hydrogen and CO2.

5. The method of claim 1 wherein the two streams fed to the step (f), that is the syngas stream and the recycled stream I, are introduced via separate feed lines equipped with separate valve lines so that the step (f) can be carried out in two distinct modes, either without CO2 capture, or with CO2 capture.

6. The method of claim 1 in which the transition from feeding the dry syngas to the H2 PSA to feeding the gas stream I to the H2 PSA and back to the dry syngas to the H2 PSA is obtained by programming two distinct cycles and passing from one cycle to the other according to the operating mode.

7. The method of claim 4, wherein the pressure of the PSA is between about 20 to 30 bar abs.

* * * * *